Figure 1:
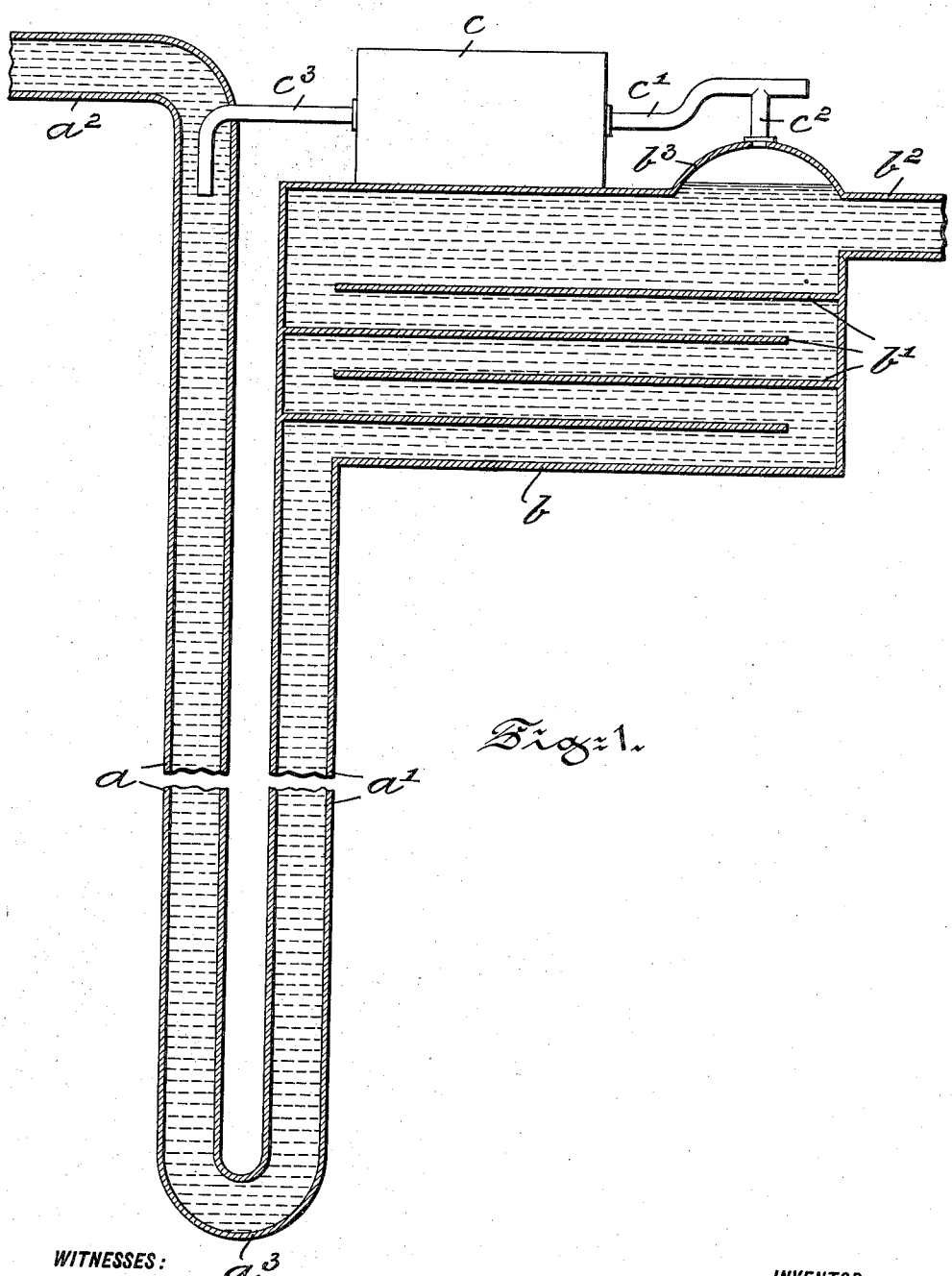

No. 850,416. PATENTED APR. 16, 1907.
J. H. BRIDGE.
MEANS FOR PURIFYING AND STERILIZING WATER BY OZONIZED AIR.
APPLICATION FILED FEB. 7, 1907.

2 SHEETS—SHEET 1.

WITNESSES:

INVENTOR

BY

ATTORNEY.

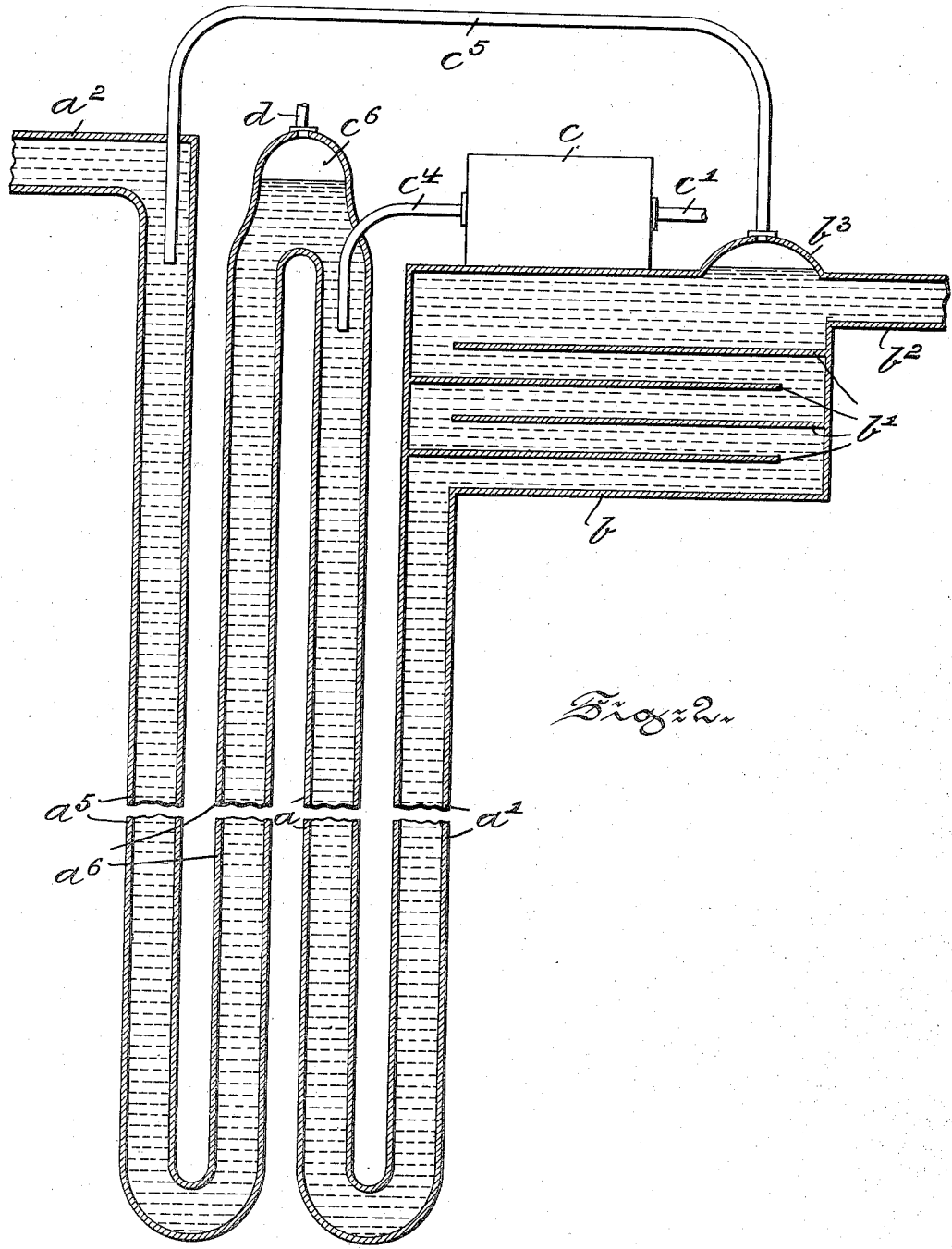

UNITED STATES PATENT OFFICE.

JAMES H. BRIDGE, OF PHILADELPHIA, PENNSYLVANIA.

MEANS FOR PURIFYING AND STERILIZING WATER BY OZONIZED AIR.

No. 850,416. Specification of Letters Patent. Patented April 16, 1907.

Application filed February 7, 1907. Serial No. 356,154.

*To all whom it may concern:*

Be it known that I, JAMES H. BRIDGE, a subject of the King of England, but who has declared his intention of becoming a citizen of the United States, and now residing at the city of Philadelphia, in the county of Philadelphia and State of Pennsylvania, have invented certain new and useful Improvements in Means for Purifying and Sterilizing Water by Ozonized Air, of which the following is a specification.

My invention has relation to means for purifying and sterilizing water by ozonized air.

The principal objects of my present invention are, first, to avoid wholly or in part the expenditure of mechanical energy involved in existing methods of forcing by compression the sterilizing-gas into a column of water, either by substituting for an air pump or compressor or supplementing it an arrangement of pipes through which ozone is drawn into a continuous body of water and mixed with it by the flow or suction action of the water itself; second, to provide means so that when thus commingled the gas and water are subjected to a gradually-increasing pressure, which gradually-increasing pressure splits up the bubbles of gas into fine particles, and so brings about a thorough commingling of the gas and water; third, to provide means for holding the ozone and water in continuous contact while gradually diminishing this pressure and while bringing about by expansion a readjustment of the gaseous molecules of the sterilizing-gas to increase their bactericidal efficiency; fourth, to hold the sterilizing-gas and water thus commingled in intimate and continuous contact and while passing in successive substantially horizontal planes to prolong their contact; fifth, to separate escaping ozone proceeding from the water under treatment and drawing it by the suction action of the current of water either into an ozonizer or directly into the water; sixth, to provide an apparatus for drawing air into an ozonizer, then into a continuous moving body of water by the suction action thereof, and to gradually compress the mixture of air and water by its own weight, so as to break up the larger bubbles and facilitate absorption of the gas, and then to expand the contained gas by gradually diminishing the pressure, then prolonging the contact by passing the ozone and water through a circuitous path, and then isolating the unabsorbed ozone and drawing it into an ozonizer for regeneration or passing it directly into a current of water by the suction action thereof; seventh, to provide means for performing these combined steps by gravity without using mechanical energy; eighth, to provide means for prolonging the circuit through which the mixture of ozone and water travels in proportion to the degree of purification required by the water; ninth, to provide means for passing the current of mingled ozone down a vertical column, thence up a vertical column, and thence backward and forward in various horizontal planes; tenth, to provide means for utilizing unabsorbed ozone for preliminary treatment of water without cooling, purifying, drying, or regenerating, and, eleventh, to provide means for isolating and utilizing unabsorbed ozone proceeding from one body of water to oxidize the soluble organic matter in another body of water, so that when fresh ozone is admitted to the latter body of water it may attack the contained bacteria with its primal strength.

The nature of my improvements and the manner in which the same are or may be carried into effect can best be explained and understood by reference to the accompanying drawings, in which I have represented apparatus embodying my invention in preferred forms, in which—

Figure 1 is a diagrammatic view illustrating partly in section and partly in elevation a U-shaped pipe terminating in a receptacle provided with a series of superposed baffles or plates arranged below the inlet for water into the U-shape pipe, an ozonizer arranged upon the receptacle, a pipe connecting the same with the U-shape pipe to transmit the suction action of the water passing therethrough to the ozonizer, and a pipe through which fresh air is drawn into the ozonizer by the water in the U-shape pipe and communicating by a branch pipe with the receptacle to also conduct escaping ozonized air back into the ozonizer by the suction action of the water passing through the U-shape pipe, all embodying features as to one form of means for carrying out my invention; and Fig. 2 is a similar view, illustrating partly in elevation and partly in section a modified form of means in which fresh air is drawn into the ozonizer and then the fresh ozonized air into a current of water and escaping ozonized air proceeding from the water under treatment is drawn into a higher part of the same current of water by the suction action of the water passing alternately up and down through a series of connected vertical U-shape pipes embodying another form of apparatus.

Referring to the drawings with reference to Fig. 1, $a$ represents a pipe preferably from seventy to one hundred feet in length and joined to an uptake $a'$ of substantially equal length. This uptake terminates in an enlarged receptacle $b$, which is placed below the inlet for water in the U-shape well or pipe $a$, formed in the present instance with a right-angular extension $a^2$. The receptacle $b$ is provided with a series of superposed baffles or plates $b'$, which cause the water to flow in a circuitous path through the receptacle $b$ before leaving through the outlet $b^2$. Upon the receptacle $b$ is arranged an ozonizer $c$ of well-known construction, which communicates with a dome-shaped extension $b^3$ of the receptacle $b$ by means of a pipe $c'$ and a branch pipe $c^2$. The ozonizer $c$ is connected by a pipe $c^3$ with the pipe or well $a$, preferably at a point adjacent to the inlet end $a^2$ of said pipe or well. The pipe $c'$ of the ozonizer $c$ preferably extends beyond the branch pipe $c^2$, so as to form an inlet for fresh air into the ozonizer $c$.

By the described arrangement of the well or pipe $a$, formed integral with the uptake $a'$, which latter is connected with the receptacle $b$ and with the ozonizer $c$, water entering the well $a$ will produce by its flow through the same a suction action and by means of which fresh air will be drawn into the ozonizer $c$ through the pipe $c'$ to become ozonized therein. This ozonized air will then be drawn through the pipe $c^3$ into the flowing column of water. By being drawn into the water the ozonized air is commingled therewith and is also subjected to pressure by passing through the well $a$, which pressure gradually increases until the apex $a^3$ of the well $a$ is reached, where for efficient action a pressure of at least two atmospheres should obtain. The air and water still held in intimate contact rises in the uptake $a'$ toward the receptacle $b$ with a gradually-diminishing pressure. This alternate compression and expansion produces a thorough commingling of the ozonized air and water and at the same time molecular readjustments of both fluids successively occur, through which the sterilizing action of the gas is stimulated. The contact of the air and water is prolonged by conducting the admixture through the receptacle $b$ in a circuitous path prior to reaching the exit $b^2$ sterilized. This contact should preferably be prolonged for several minutes, so as to insure a complete sterilization of the water prior to its discharge from the apparatus. The ozone unabsorbed by the water rises into the extension $b^3$ of the receptacle $b$, from which it is drawn back into the ozonizer $c$ through the pipes $c^2$ and $c'$ by the suction action of the flowing water passing through the pipe or well $a$.

When it is desired to conduct escaping ozone directly back into a current of flowing water by the suction action of the same without passing it through the ozonizer before reaching the water, a modified form of apparatus, such as shown in Fig. 2, may be employed for this purpose. To permit of successively increasing and decreasing the compression of the mingled air and water under treatment, a second well $a^5$ and an uptake $a^6$, respectively, are joined to the well $a$ and uptake $a'$ of Fig. 1, as indicated in Fig. 2. In this instance the ozonizer $c$ by means of a pipe $c^4$ is connected with the second well $a$, while the dome-shaped extension $b^3$ of the receptacle $b$ by means of a pipe $c^5$ is directly connected with the well $a^5$. Thus the ozone escaping from the water in the receptacle $b$ will be conducted into the well $a^5$ by the suction action of the water passing therethrough, while the fresh air drawn into the ozonizer $c$ and ozonized therein will be conducted into the second well $a$, and water to be treated will be subjected to the action first of ozonized air already having acted upon the water and thereafter to fresh ozonized air coming directly from the ozonizer $c$.

In Fig. 2 it will be observed that escaping ozone will be drawn from the extension $b^3$ directly into the current of water passing down the well $a^5$ for the purpose of subjecting the same to preliminary ozonization. It has been found when ozone is introduced into water it first oxidizes the organic matter held in solution, and then what is left of the ozone acts upon the bacteria. Since the destruction of bacteria is the chief aim sought in the ozonization of water, the apparatus shown in Fig. 2 leaves the fresh ozone, which passes into a lower part of the same stream in the well or pipe $a$ free to act with its primal strength upon the bacteria, thus to destroy the same. At the same time the old ozone is absorbed in its passage down the well or pipe $a^5$ and by the uptake $a^6$. In the pipe $a^5$ it is subjected to a pressure of two to four atmospheres, more or less, and then in the uptake $a^6$ it is allowed to gradually expand, the residual ozone combining with the organic matter in solution until at $c^6$ nothing but air mixed with impure gases is left to escape into the atmosphere by means of the pipe $d$.

Since a current of water must have a very high velocity in order to draw in by suction sufficient ozonized air to effect complete sterilization and since it has been found that a contact of six (6) minutes is sometimes required to destroy all the bacteria in badly-polluted water, it follows that the wells or pipes $a$ and $a^5$ in, respectively, Figs. 1 and 2, however profound, must be supplemented by an ample receiving chamber or receptacle in which by means of baffles, plates, or other obstructions the water and ozonized air can be maintained in continuous intimate contact for prolonged periods. Further, it has been found that the comminuting effect of a pressure of two or more atmospheres is necessary to break up bubbles of air as they travel down a column of fluid. For this reason it is desirable that the wells $a$ and $a^5$ in, respectively, Figs. 1 and 2 should have a length of from seventy to one hundred feet, more or less. It is also important for efficient action that the ozonized air and water be held in continuous intimate contact while undergoing a gradually-increasing pressure in the pipes or wells $a$ and $a^5$, Figs. 1 and 2, and a gradually-diminishing pressure in the uptake $a'$, and a slow circulatory movement inside the final receptacle $b$ for effecting good results in the sterilization of the fluid.

Having thus described the nature and objects of my invention, what I claim as new, and desire to secure by Letters Patent, is—

1. Means for purifying or sterilizing water, comprising a pipe having an uptake leading therefrom and a receptacle provided with obstructions, the latter directly connected with said uptake, the construction and arrangement being such that ozonized air, by the suction action of the flowing water, is drawn into the body of water by a gradually-increasing pressure, and then, by a gradually-decreasing pressure induced by the water, presented to the obstructions of said receptacle for prolonging the ozonized air in intimate contact with the water for variable periods to insure thorough sterilization of the water.

2. Means for sterilizing a liquid by a gas, comprising a generator for the gas, an arrangement of pipes for drawing by gravity the sterilizing-gas into the liquid under treatment, a pipe or well in which the mingled gas and liquid are gradually compressed by their own weight, an uptake leading therefrom and in which the gas and liquid are held in continuous contact while subject to a gradually-diminishing pressure as they ascend, and a receptacle continuing the admixture of gas and liquid by causing them to travel laterally through or about obstructions placed in the path of the flowing fluids.

3. Means for sterilizing a liquid by a gas, comprising a generator for the gas, an arrangement of pipes for drawing by gravity the sterilizing-gas into the liquid under treatment, a pipe or well in which the mingled gas and liquid are gradually compressed by their own weight, an uptake leading therefrom and in which the gas and liquid are held in continuous contact while subject to a gradually-diminishing pressure as they ascend, and a receptacle continuing the admixture of gas and liquid by causing them to travel laterally through or about obstructions placed in the path of the flowing fluids and a chamber for separating unabsorbed gas from the liquid for further utilization.

4. Means for sterilizing a liquid by a gas, comprising a generator for the gas, an arrangement of pipes for drawing by gravity the sterilizing-gas into the liquid under treatment, a pipe or well in which the mingled gas and liquid are gradually compressed by their own weight, an uptake leading therefrom and in which the gas and liquid are held in continuous contact while subject to a gradually-diminishing pressure as they ascend, and a receptacle continuing the admixture of gas and liquid by causing them to travel laterally through or about obstructions placed in the path of the flowing fluids, a chamber for separating unabsorbed gas from the liquid, and means for passing it into the generator for regeneration.

5. Means for sterilizing a liquid by a gas, comprising a generator for the gas, an arrangement of pipes for drawing by gravity the sterilizing-gas into the liquid under treatment, a pipe or well in which the mingled gas and liquid are gradually compressed by their own weight, an uptake leading therefrom and in which the gas and liquid are held in continuous contact while subject to a gradually-diminishing pressure as they ascend, a receptacle continuing the admixture of gas and liquid by causing them to travel laterally through or about obstructions placed in the path of the flowing fluids, a chamber for separating unabsorbed gas from the liquid and means for drawing it then by the suction action of a current of water into the same.

6. Means for sterilizing water by ozone, comprising an ozonizer, an arrangement of pipes to utilize the suction action of a moving body of water to draw air into the ozonizer and ozonized air therefrom into the body of water, a pipe or well through which the admixture is led to subject it to a gradually-increasing pressure by the gravitative action of the descending column of gas and water, an uptake leading therefrom in which the gas and water are maintained in continuous contact while subject to a gradually-decreasing pressure as the mingled gas and water ascend, a receptacle in which the admixture of gas and water is prolonged by baffles or other obstructions placed in the path thereof to cause the same to travel successively in more or less horizontal planes.

7. Means for sterilizing water by ozone, comprising an ozonizer, an arrangement of pipes to utilize the suction action of a moving body of water to draw air into the ozonizer and ozonized air therefrom into said body of water, a pipe or well through which the admixture is led while subject to a gradually-increasing pressure by the gravitative action of the descending column of gas and water, an uptake leading therefrom in which the gas and water are maintained in continuous contact while subject to a gradually-decreasing pressure as the mingled gas and water ascend, a receptacle in which the admixture of gas and water is prolonged by baffles or other obstructions placed in the path thereof to cause the same to travel in successive more or less horizontal planes, a chamber in which unabsorbed ozone is separated from the water and an arrangement of pipes by which the unabsorbed ozone is withdrawn for utilization.

8. Means for sterilizing water by ozone, comprising an ozonizer, an arrangement of pipes to utilize the suction action of a moving body of water to draw air into the ozonizer and ozonized air therefrom into said body of water, a pipe or well through which the admixture is led to subject it to a gradually-increasing pressure by the gravitative action of the descending column of gas and water, an uptake leading therefrom in which the gas and water are maintained in continuous contact while subject to a gradually-decreasing pressure as the mingled gas and water ascend, a receptacle in which the admixture of gas and water is prolonged by baffles or other obstructions placed in the path thereof to cause the same to travel successively in more or less horizontal planes; a chamber in which unabsorbed ozone is separated from the water and an arrangement of pipes by which the unabsorbed ozone is drawn into a current of water by its suction action to purify the same.

9. Means for purifying and sterilizing a liquid, which consists of a pipe for thoroughly commingling and compressing a sterilizing gas and a fluid and expanding the mixture of gas and fluid therein by a gradually-decreasing pressure and a receptacle provided with obstructions across the path of the currents therethrough to prolong the admixture of the gas and fluid therein, the construction being such as to be adapted to maintain the sterilizing-gas and liquid in intimate and continuous contact during entire circuit of said means.

10. An aspirator-sterilizer, comprising a pipe or well for thoroughly commingling ozonized gas and water, an uptake leading therefrom for expanding the admixture of gas and water and holding while subject to a diminishing pressure and a receptacle provided with obstructions, across the path of the current therethrough, to prolong the admixture of the gas with the fluid.

11. An aspirator-sterilizer, comprising a pipe or well for thoroughly commingling ozonized gas and water, an uptake leading therefrom for expanding the admixture of gas and water and holding while subject to a diminishing pressure and a receptacle provided with obstructions, across the path of the current therethrough, to prolong the admixture of the gas with the fluid, and a chamber for separating the excess of ozone from the fluid.

12. An aspirator-sterilizer, comprising a pipe or well for thoroughly commingling ozonized gas and water, an uptake leading therefrom for expanding the admixture of gas and water and holding while subject to a diminishing pressure, and a receptacle provided with obstructions, across the path of the current therethrough, to prolong the admixture of the gas with the fluid, and a chamber for separating the excess of ozone from the fluid and means for leading the excess of ozonized gas from the separating-chamber directly into a current of flowing fluid.

In witness whereof I have hereto affixed my signature in the presence of two subscribing witnesses.

JAMES H. BRIDGE.

Witnesses:
J. WALTER DOUGLASS,
GEO. W. REED.